Patented Apr. 28, 1953

2,636,826

UNITED STATES PATENT OFFICE 2,636,826

SILICON CARBIDE REFRACTORY

Kenneth C. Nicholson, Niagara Falls, N. Y., assignor to The Carborundum Company, Niagara Falls, N. Y., a corporation of Delaware No Drawing. Application June 2, 1950,
Serial No. 165,879

8 Claims. (Cl. 106—44)

This invention relates to improved silicon nitride-bonded silicon carbide articles and to compositions for making said articles.

Silicon carbide is generally reserved for the making of refractories which are to be used under severe operating conditions where the temperature is extremely high, the fluctuations in temperature are abnormally great, the requirements of mechanical strength at elevated temperatures are excessive, and/or the corrosive and erosive conditions of use are severe in one or more respects. The high thermal conductivity of silicon carbide also makes it an ideal material for certain refractory applications, as for example, where rapid heat transfer is desired. The superiority of bonded silicon carbide refractories over the more inexpensive fire clay products has justified the added cost of using silicon carbide products in many cases. Considerable attention has been paid therefore to ways of taking the best possible advantage of the extremely refractory properties and qualities of the silicon carbide particles by the use therewith of bonding materials which are themselves of sufficient refractoriness that they do not materially detract from the satisfactoriness of the silicon carbide material. In spite of the extensive activity in this direction the full benefits to be derived from the highly refractory, resistant character of the silicon carbide itself have never been realized.

Heretofore efforts to produce a bond for silicon carbide particles which would have an extremely high strength at elevated temperatures and would be resistant to substantial fluctuations in temperature and at the same time would be satisfactorily resistant to oxidation have been only partially successful. Clays and other ingredients producing bonds of the porcelain type have resulted in bodies which have had good hot strength, but which are not sufficiently oxidation resistant to give a satisfactory life. Other silicon carbide bodies using bonds of a glassy nature have been fairly resistant to oxidation, only to fail at operating temperatures because of softening of the glass bond and loss of strength. Attempts to improve the properties of such articles by the application of various glazes to the formed article or by the incorporation of glaze-developing materials within the body of the article as a component of the bonding material have not been entirely successful, sometimes because of the temporary character of the glaze and in other instances because of the tendency of the glaze to cause staining or discoloration of articles coming in contact with the refractory during use at high temperatures. Such disadvantages have greatly limited the range or field of use in which bonded silicon carbide refractories have been capable of application.

A high resistance to spalling as well as a fairly high strength at elevated temperatures has led also to the use of coke residue bonds in spite of the fact that such bonds are even more susceptible to rapid oxidation and destruction than is silicon carbide.

Recently, according to a pending patent application Serial No. 11,356, filed February 26, 1948, by John P. Swentzel, silicon nitride-bonded silicon carbide bodies in which the granular silicon carbide of the body has been bonded by silicon nitride have been made, which are superior in many respects to the older types of bonded silicon carbide bodies in which clay, glass, porcelain and carbon bonds have been used.

However, regardless of the type of bond heretofore used each one has had some specific disadvantage to limit its field of application or appreciably shorten its useful life.

It is an object of the present invention to provide an improved silicon nitride-bonded silicon carbide body which will stand up under heavy loads at high temperatures.

It is a further object to provide an improved silicon nitride-bonded silicon carbide body which is highly resistant to heat shock or rapid fluctuations in temperatures.

It is a still further object to provide an improved silicon nitride-bonded silicon carbide article in which the bond as well as the silicon carbide component is of a refractoriness considerably above that of such common bonding materials as glass, porcelain and the like.

It is a further object to provide an improved silicon nitride-bonded silicon carbide article which, in addition to possessing the aforesaid properties, will be sufficiently resistant to oxidation to permit its continued use at temperatures as high as 1450° C. and even higher.

It is a still further object to provide a silicon carbide material or body that avoids the disadvantages of prior practice.

In accordance with the present invention, bonded silicon carbide articles are formed in which the silicon carbide grains are held together by a silicon nitride bond modified by the inclusion in the bond of a small amount of zirconium or a zirconium compound. For example, the bond is modified by the inclusion in the raw batch from which the article is formed of 3 to 7% by weight of zirconium oxide, which is preferably of the kind known as stabilized zirconium oxide, which has been stabilized by heating to a high temperature with certain oxides, e. g. 3 to 6% calcium oxide. However, other zirconium materials may be used such as zirconium nitride, or metallic zirconium with satisfactory results. The presence of the zirconium oxide or other zirconium material in the silicon nitride bond has the effect of substantially improving the resistance of the finished article to spalling or cracking under the heat shock of sudden temperature changes. It is not fully known whether the zirconium oxide or other zirconium compound or material exists in the finished article in the same form in which it has been introduced or whether it has chemically combined with other constituents of the article or been converted to some other zirconium compound during the firing operation, in order to accomplish its function of increasing the spall or crack resistance of the finished body.

The bonding of the silicon carbide grains by silicon nitride is obtained in articles made according to the present invention by intimately mixing silicon of the required degree of fineness with the silicon carbide grains and the modifying zirconium or zirconium compound, moistening to form a moldable mixture, molding the desired mass or shape from the resulting mixture of silicon, zirconium material and silicon carbide, drying the thus formed article and firing it in a non-oxidizing, nitrogenous atmosphere at a temperature and period of time sufficient to convert the silicon metal to silicon nitride. It has been found that highly satisfactory results are to be obtained by using commercial grade silicon ground to suitable fineness. Analysis of a commercial grade of silicon which has been satisfactorily used in carrying out the present invention discloses, in addition to the silicon, the presence of the following impurities:

|  | Per cent |
|---|---|
| Iron | 0.87 |
| Chromium | 0.21 |
| Aluminum | 0.60 |
| Calcium | 0.54 |

In order to obtain a satisfactory conversion of the silicon to silicon nitride having the formula $Si_3N_4$, within a reasonable period of time when a commercial grade silicon powder of the above type is used, the silicon should be fine enough to pass through a screen of around 200 mesh size (U. S. Standard Sieve and finer, which is around 70 to 90 microns and finer in particle size. Still more rapid nitriding is obtained when the silicon is of a fineness in the neighborhood of 10–20 microns and finer. Satisfactory conversion of the silicon to silicon nitride bond also has been obtained with pure silicon (99.8% silicon), although it has been found that when the pure form of silicon is used, the period of time required for nitriding is much longer than that required for nitriding articles of similar size and shape formed of commercial grade silicon of the same degree of fineness provided the other conditions of the nitriding operation are the same. The rate of conversion of the silicon to silicon nitride when pure silicon is used can be increased by a reduction of the silicon to a finer particle size. It also has been found that the rate of conversion of the pure form of silicon to silicon nitride can be increased by adding a small percentage of iron powder, say, in the neighborhood of ¾% to 1% by weight, which is the amount commonly found in commercial grade silicon, to the pure silicon. The greater ease of conversion of the silicon to silicon nitride when commercial grade silicon containing the aforementioned impurities is used as compared with the nitriding action obtained with pure silicon is to be attributed, therefore, to the presence of the small amount of iron impurity commonly found in the commercial grade of silicon metal.

It is also desirable in the making of various shapes to incorporate a small amount of bentonite in the raw batch in order to obtain a mixture of suitable molding consistency in which the silicon and other bond ingredients are uniformly distributed throughout the mass.

In order that the invention may be more fully understood the following specific example is submitted for illustrative purposes and indicates the manner in which silicon carbide articles bonded by a zirconium-modified silicon nitride bond can be formed in accordance with the practices and principles of the present invention.

*Example I*

Silicon carbide rocket motor nozzles 3½ inches long having an outside wall taper with an outside diameter of 3⅞ inches at one end to 2½ inches at the opposite end and an inside diameter of 3⅛ to 1¾ inches, the throat having a curved restriction intermediate the ends of the nozzle, have been molded from the following composition:

|  | Parts by weight |
|---|---|
| 14–36 Mesh size silicon carbide grain | 46 |
| 80 and finer silicon carbide grain | 35 |
| 200 Mesh size and finer silicon powder | 15 |
| 200 Mesh size and finer fused zirconium oxide, stabilized with 6% CaO | 4 |
| Dry lignone (Ligno-sulfonate residue from paper pulp manufacture) | 5 |
| Bentonite gel | 6 |

The above ingredients, with the exception of the bentonite gel, are dry mixed in a tumbling barrel for 15 minutes to insure good blending, after which they are wet mixed for an additional 20 minutes in a kneader mixer. The mix is wet to the proper pressing consistency with the bentonite gel which is made of 4 parts of water and 1 part dry bentonite powder. The bentonite gel serves to take up the zirconium oxide and the finely divided silicon powder, which latter particularly is otherwise very fluffy and extremely difficult to handle, and distribute them evenly and uniformly throughout the molding mixture and provide a well blended batch of suitable consistency for molding.

The nozzles are formed by pressing in a hydraulic press at a pressure in excess of 5000 pounds per square inch. The molded shapes are dried at 200–250° F., and the dried nozzles then placed in a muffle furnace and the normal atmosphere in the muffle is replaced by a continuous stream of commercial grade nitrogen having a purity of 99.7%, after which the temperature of the furnace chamber is gradually raised over a period of several hours to 1400° C. and held at that temperature until the articles have increased in weight from 7% to 10% of the dried, unfired weight, while a continuous stream of nitrogen is fed into the furnace muffle. The firing of nozzles of the above-described size and shape have been found to require holding at a temperature of around 1400° C. for about 12 hours to obtain satisfactorily thorough formation of silicon nitride. The furnace with the nitrogen still flowing is allowed to cool to room temperature or to a temperature convenient for handling the fired shapes whereupon they are removed from the furnace ready for use. The resulting nozzles will withstand sudden changes in temperature, i. e., heat shock, without cracking or spalling to a much greater degree than nozzles of similar shape and size made of the same compositions without the inclusion of the zirconium. Moreover, the improvement in resistance to heat shock is obtained without detracting from the refractory properties and strength of the articles at elevated temperatures, and in fact, if anything, the presence of the zirconium in the bond is believed to enhance the bonded bodies in respects other than the increase in spall and crack resistance.

It is of interest to note that there is no change in the volume of the articles as a result of the firing operation. It is found upon weighing the molded and dried articles before and after the firing operation that they undergo a gain in weight of approximately 7–10%, which, if calculated on the basis of the silicon content of the article, and corrected for loss of volatile matter, indicates a gain in weight of the silicon bond of over 60%, thereby indicating that there has been a substantially complete conversion of the silicon in the raw batch to the silicon nitride in the finished article.

Although nitrogen gas having a purity of 99.7% has been mentioned for use in the example set forth above, similar results can be obtained by the use of other non-oxidizing atmospheres containing nitrogen. For example, commercial annealing hydrogen, which has an approximate analysis of 93% nitrogen and 7% hydrogen, or ammonia gas can be similarly used in place of nitrogen.

Although I have indicated a number of non-oxidizing, nitrogenous gases which can be used as a direct source of nitrogen during the nitriding operation by carrying out that reaction in a reaction chamber into which the nitrogenous gas is continuously passed, it is to be recognized that if desired the nitriding reaction can be effectively carried out in other manners providing that the atmosphere immediately adjacent and within the article being nitrided is maintained substantially non-oxidizing in character and providing an ample supply of nitrogen is furnished the article. For example, in firing bodies or molded shapes in which a zirconium-modified silicon nitride bond is to be formed in accordance with the present invention the body can be embedded in a suitable mixture of coke and sand and the article fired at the aforementioned temperatures. The silicon is converted to silicon nitride by the nitrogen of the air, which penetrates the embedding mixture and reacts with the silicon contained in the articles embedded therein. The coke of the embedding mixture combines with the oxygen of the air and forms carbon monoxide before the free oxygen has an opportunity to reach the articles being fired, so that the gases penetrating to the article are substantially a mixture of nitrogen and carbon monoxide. Under these conditions substantially all the silicon will combine with the nitrogen to form silicon nitride. Obviously, sufficient coke must be provided in the mixture to provide an excess of carbon, so that carbon monoxide will be formed rather than carbon dioxide, and so that no free oxygen will be present. The embedding material must be of sufficient quantity to function in the prescribed manner. As further assurance that an ample supply of oxygen-free nitrogen is freely available to each article being thus fired, each individual shape must be spaced from adjoining articles with ample intervening embedding material. Otherwise, satisfactory nitriding does not take place in a reasonable length of time.

Moreover, although specific temperatures or temperature ranges have been recited in the aforementioned example for the nitriding operation, and best results, i. e., most efficient and thorough conversion of the silicon to silicon nitride are found to take place when the nitriding operation is performed at temperature ranges slightly below the melting point of silicon (1420° C.), as, for example, 1350–1400° C., satisfactory nitriding has been obtained at temperatures as low as in the neighborhood of 1300° C. Furthermore, during the nitriding operation, and particularly after the nitriding has progressed for sometime, the temperatures can be raised well above the melting point of silicon as further assurance of the substantially complete conversion of the silicon to silicon nitride.

The ratio of silicon nitride bond to silicon carbide provided in the bonded silicon carbide articles made in accordance with the present invention is not critical and may vary considerably depending upon the type of article being fabricated and the particular combination of properties desired therein, and depending upon the specific use to which the article being formed is to be put. The silicon nitride bond may amount to as little as 5% of the finished article without departing from the spirit of the invention.

It is also desired to point out that modified silicon carbide bodies having a zirconium-modified silicon nitride bond of the herein described type may be obtained in various ways by addition or substitution of other ingredients without departing from the spirit or scope of the present invention. For instance, a more plastic composition can be made by the addition of minor amounts of one or more clays to the mix. This modification is particularly applicable to the fabrication of more intricate shapes or of articles which are to be used at lower temperatures where high refractoriness is not desired. Similarly, silicon carbide bodies can be made according to the present invention, but in which a part of the silicon carbide grain, either the coarse or the fine fractions, is replaced by a refractory oxide, silicate, or spinel such as alumina, mullite, magnesia or the like.

Likewise, articles or bodies can be made in accordance with the present invention in which pore-forming materials are incorporated in the raw batch from which the body is made for the purpose of providing a greater degree of porosity in the final body. A pore-forming material, such as carbon or the like, which requires oxidation for removal from a body, would require a preliminary burning out of the pore-forming material at lower temperatures. Therefore, the pore-forming material preferably should be a material which is removed by volatilization during the drying and/or firing operation such as powdered or granular naphthalene, various organic resinous materials such as phenolic resins and the like or one which provides pores by reason of the generation of a gas. The resulting bodies, which have greater porosity than those made with no pore formers, are particularly useful in the fabrication of porous diffusion and filtering media, catalysts and catalyst carriers, insulation bodies and the like, whether in crushed granular form or in the form of molded shapes of predetermined contour.

The articles made in accordance with the present invention may be molded by any of the well-known methods including pressure molding, machine tamping, hand tamping, jolting, vibrational tamping, air hammer flat or edge tamping, or slip casting.

It is to be understood that the products of the present invention in its various modifications are not limited to any specific field or fields of use such as might be defined by the specific example previously set forth. The products can be made in any desired shape as well as provided in granular or aggregate form. They are, therefore, not only suited for many of the uses for which industrial rafractories are required, including bricks, blocks, setter tile, muffles, kiln furniture, and special shapes for application in and around furnaces and other high temperature equipment, but they are also well suited for many specialty high temperature applications, such as jet engine combustion chambers, linings for exhaust nozzles, rocket motor combustion chambers and exhaust nozzles, turbine blades, stator blades, lens fusion blocks, and the like. They are also suitable for the fabrication of laboratory ware, including combustion boats, crucibles, burner holders, and other shapes.

The resistance of such bodies to chemical attack makes them highly suitable for the making of articles used in the containing, conveying and handling of many acids, alkalies and other corrosive chemicals, including such articles as chambers and chamber linings, crucibles, pipes and pipe fittings, and other sundry shapes. The bodies of the present invention, particularly when modified by the use of pore formers in the raw batch from which the bodies are made, are also highly useful as diffusion and filtering media, such as diffusion tubes and plates, filtering tubes, plates and shapes, or as catalysts or catalyst carriers and supports.

Materials and articles of the present invention also can be made for abrasive purposes, such as grinding wheels, sharpening stones, razor hones, and other grinding and polishing shapes and materials. The present bodies may be useful in many articles in the electrical and radio industry including supports in electric light bulbs, radio tubes, X-ray tubes and radar equipment, resistors and grid leaks. Other miscellaneous uses include its use as thread guides, wire drawing dies, blasting nozzles, heating elements, and the like.

Having thus described the invention it is desired to claim:

1. A bonded silicon carbide article comprising silicon carbide grains and a silicon nitride bond, said bond containing zirconium oxide.

2. A bonded silicon carbide article comprising silicon carbide grains and a silicon nitride bond, said bond containing 3–7% zirconium oxide.

3. A bonded silicon carbide article comprising silicon carbide grains and a silicon nitride bond, said bond containing approximately 4% zirconium oxide.

4. A bonded silicon carbide article comprising silicon carbide grains and a silicon nitride bond containing 3–7% of a zirconium compound.

5. A raw batch for the manufacture of bonded silicon carbide bodies, said raw batch comprising silicon carbide grain, finely divided silicon, and 3–7% by weight of zirconium oxide.

6. A raw batch for the manufacture of bonded silicon carbide bodies, said raw batch comprising silicon carbide grain, finely divided silicon, and 3–7% by weight of precalcined zirconium oxide.

7. A raw batch for the manufacture of bonded silicon carbide bodies, said raw batch comprising silicon carbide grain, finely divided silicon, and 3–7% by weight of stabilized zirconium oxide.

8. A raw batch for the manufacture of bonded silicon carbide bodies, said raw batch comprising silicon carbide grain, finely divided silicon, and 3–7% by weight of stabilized zirconium oxide containing 3–6% of calcium oxide.

KENNETH C. NICHOLSON.

References Cited in the file of this patent
UNITED STATES PATENTS

| Number | Name | Date |
|---|---|---|
| 2,364,108 | Swentzel | Dec. 5, 1944 |
| 2,406,275 | Wejnarth | Aug. 20, 1946 |